US009798095B2

(12) United States Patent
Fujiwara et al.

(10) Patent No.: US 9,798,095 B2
(45) Date of Patent: Oct. 24, 2017

(54) CONNECTOR HOUSING AND OPTICAL WAVEGUIDE ASSEMBLED BODY

(71) Applicant: SUMITOMO BAKELITE CO., LTD., Shinagawa-ku (JP)

(72) Inventors: Daisuke Fujiwara, Tokyo (JP); Sho Kubota, Tokyo (JP)

(73) Assignee: SUMITOMO BAKELITE CO., LTD., Shinagawa-ku (JP)

( * ) Notice: Subject to any disclaimer, the term of this patent is extended or adjusted under 35 U.S.C. 154(b) by 0 days.

(21) Appl. No.: 15/027,941

(22) PCT Filed: Oct. 18, 2013

(86) PCT No.: PCT/JP2013/078296
§ 371 (c)(1),
(2) Date: Apr. 7, 2016

(87) PCT Pub. No.: WO2015/052850
PCT Pub. Date: Apr. 16, 2015

(65) Prior Publication Data
US 2016/0238799 A1 Aug. 18, 2016

(30) Foreign Application Priority Data
Oct. 10, 2013 (JP) ................................. 2013-212547

(51) Int. Cl.
*G02B 6/38* (2006.01)
(52) U.S. Cl.
CPC ........... *G02B 6/3887* (2013.01); *G02B 6/387* (2013.01); *G02B 6/3882* (2013.01); *G02B 6/3885* (2013.01)
(58) Field of Classification Search
CPC ..... G02B 6/387; G02B 6/3885; G02B 6/3887
See application file for complete search history.

(56) References Cited

U.S. PATENT DOCUMENTS 6,259,856 B1 * 7/2001 Shahid ................. G02B 6/3885
  385/147
6,606,445 B2 * 8/2003 Weigel ................. G02B 6/3861
  385/137
(Continued)

FOREIGN PATENT DOCUMENTS

JP  5-66321 A  3/1993
JP  11-515114 A  12/1999
(Continued)

OTHER PUBLICATIONS

"Detail Specification for PMT Connector", Japan Electronics Packaging and Circuits Association, JPCA, Total 21 Pages, (May 2006) (with Partial English Translation).
(Continued)

*Primary Examiner* — Daniel Petkovsek
(74) *Attorney, Agent, or Firm* — Oblon, McClelland, Maier & Neustadt, L.L.P.

(57) ABSTRACT

A connector housing includes a housing including a front end portion, a base end portion having end opening, and an inner cavity portion extending from the front end portion to the base end portion and formed such that a front portion of a flexible optical waveguide having band shape is inserted from the end opening into the cavity to the front end portion. The cavity has a length that extends in longitudinal direction of the waveguide, a width that extends in width direction of the waveguide, and a height that extends in thickness direction of the waveguide, and the housing has a pair of walls forming a pair of inner surfaces facing each other in the cavity such that the inner surfaces is gradually increasing a separation distance between the inner surfaces in the thickness direction of the waveguide toward base end side of the housing at the end opening.

20 Claims, 5 Drawing Sheets

(56) References Cited

U.S. PATENT DOCUMENTS

| | | | |
|---|---|---|---|
| 8,554,041 B2* | 10/2013 | Mune | G02B 6/1221 |
| | | | 385/131 |
| 8,845,208 B2* | 9/2014 | Tsujita | G02B 6/138 |
| | | | 385/59 |
| 2001/0006573 A1 | 7/2001 | Weigel | |
| 2001/0041034 A1* | 11/2001 | Sasaki | G02B 6/30 |
| | | | 385/88 |
| 2011/0222818 A1 | 9/2011 | Mune et al. | |
| 2012/0205825 A1* | 8/2012 | Nagafuji | G02B 6/3855 |
| | | | 264/1.25 |

FOREIGN PATENT DOCUMENTS

| | | | | |
|---|---|---|---|---|
| JP | 2004-226626 A | 8/2004 | | |
| JP | 2005-84140 A | 3/2005 | | |
| JP | 2005-208168 A | 8/2005 | | |
| JP | 2005-316008 A | 11/2005 | | |
| JP | 2011-164548 A | 8/2011 | | |
| JP | 2011-191438 A | 9/2011 | | |
| JP | 2012247732 A * | 12/2012 | | G02B 6/36 |

OTHER PUBLICATIONS

Makoto Hikita, et al., "PMT Connector for Polymer Waveguides", IEICE Technical Report, vol. 107. No. 408, pp. 29-33, (Dec. 14, 2007) (with English Abstract).

Yutaka Hatakeyama, et al., "PMT connectors for multi-channel film waveguides", Proc. of SPIE, vol. 7213, Total 12 Pages, (Feb. 12, 2009).

International Search Report dated Nov. 19, 2013 in PCT/JP13/078296 Filed Oct. 18, 2013.

\* cited by examiner

CONNECTOR HOUSING AND OPTICAL WAVEGUIDE ASSEMBLED BODY

TECHNICAL FIELD

The present invention relates to a connector housing and an optical waveguide assembly. Priority is claimed on Japanese Patent Application No. 2013-212547, filed Oct. 10, 2013, the content of which is incorporated herein by reference.

BACKGROUND ART

In recent years, optical communication for transferring data using optical frequency carrier waves has become increasingly important. In this type of optical communication, an optical waveguide has been used as a means for guiding the signal propagating light that propagates signals from one location to another location. The optical waveguide is connected to another optical waveguide in a state where a connector housing is mounted to a front end portion (see Non-Patent Document 1).

The optical waveguide is composed of, for example, a core layer and a pair of cladding layers, each provided on both surfaces of the core layer. The core layer includes a linear core portion and a cladding portion, and these are arranged alternately.

The connector housing described in Non-Patent Document 1 includes a housing main body, a lid body and a protective member. The housing main body has a groove in which a front end portion of the optical waveguide is accommodated. The protective member is a cylindrical member having an inner cavity portion in which both ends are opened and the optical waveguide is inserted. The lid body is a plate member for closing the aforementioned groove. This type of connector housing is mounted onto the optical waveguide by collectively holding the optical waveguide and the protective member between the lid member covering the groove and the bottom surface of the groove. Further, in the optical waveguide in this state, a portion covered by the protective member is protected, and sharp bending of the portion is prevented.

CITATION LIST

Patent Documents

Non-Patent Document 1: Japan Electronics Packaging and Circuits Association, JPCA Standards "Detailed Standards for PMT Optical Connector" [online], May 2006, [Searched on Jul. 30, 2012], Internet <URL: http://www.jpca.net/hikari/pdf/jpca-pe03-01-07s-2006.pdf>

SUMMARY OF INVENTION

Technical Problem

Incidentally, in the protective member described in Non-Patent Document 1, since the inner diameter of the inner cavity portion is constant along the central axis direction, the shape of the edge portion of the base end opening becomes angulated, in other words, a corner portion is formed at the edge portion of the base end opening. For this reason, the optical waveguide is easily bent with the aforementioned corner portion serving as a fulcrum. In this case, there has been a possibility that the optical waveguide is sharply bent to an extent so as to cause damages.

An object of the present invention is to provide a connector housing having a simple structure which is capable of suppressing or preventing sharp bending of an optical waveguide and an optical waveguide assembly including the connector housing.

Solution to Problem

Such an object can be achieved by the respective aspects (1) to (12) of the present invention described below.

(1) A connector housing configured to be mounted to a front end portion of an optical waveguide having a band-like shape as a whole and having at least one core portion and cladding portions surrounding the core portion, the connector housing including:
  a housing including an inner cavity portion penetrating from a front end to a base end, the front end portion of the optical waveguide configured to be inserted into the inner cavity portion, and
  a distance between walls of the inner cavity portion in the thickness direction of the optical waveguide at the base end opening is gradually increasing toward the base end side when the front end portion of the optical waveguide is inserted.

(2) The connector housing according to the above aspect (1), wherein
  the inner cavity portion is defined by a plurality of inner wall surfaces including a pair of inner wall surfaces facing in the thickness direction of the optical waveguide, and
  at least one of the pair of inner wall surfaces includes, in a portion facing the opening, a slope portion, the slope portion being inclined so as to be gradually separated from the central axis along the penetrating direction of the inner cavity portion.

(3) The connector housing according to the above aspect (2), wherein
  each of the pair of inner wall surfaces includes the slope portion.

(4) The connector housing according to the above aspect (2) or (3), wherein
  the slope portion has an average curvature R of not less than 3 mm and not more than 10 mm.

(5) The connector housing according to any one of the above aspects (2) to (4), wherein
  a gap is formed between the optical waveguide and the slope portion at the opening.

(6) The connector housing according to any one of the above aspects (2) to (5), wherein
  the slope portion has an angle of inclination which varies along the central axis direction.

(7) The connector housing according to any one of the above aspects (2) to (6), wherein
  the slope portion forms a curved shape that is bent along the central axis direction.

(8) The connector housing according to any one of the above aspects (2) to (7), wherein
  the slope portion includes a plurality of planes, each of the planes having a different angle of inclination with respect to the central axis.

(9) The connector housing according to any one of the above aspects (2) to (8), wherein
  a length of the slope portion along the central axis direction is from 10% to 50% of a length of the inner cavity portion along the central axis direction.

(10) The connector housing according to any one of the above aspects (1) to (9), wherein the housing includes:
  a main body having a groove that defines at least a part of the inner wall surfaces of the inner cavity portion, and
  a lid body configured to cover an opening of the groove.
(11) The connector housing according to the above aspect (10), wherein
  the housing is mounted to the optical waveguide by holding the front end portion of the optical waveguide between a bottom surface of the groove and the lid body.
(12) An optical waveguide assembly, including:
  a band shaped flexible optical waveguide; and
  the connector housing according to any one of the above aspects (1) to (11) configured to be mounted to the front end portion of the optical waveguide.

Advantageous Effects of Invention

According to the present invention, in the opening of the connector housing, the optical waveguide can be bent and deformed. Therefore, the present invention can reliably suppress or prevent sharp bending of the optical waveguide.

Conventional connector housings have been configured by three members consisted of a main body, a lid body and a protective member. However, in the present invention, even if the protective member is omitted, it is possible to reliably suppress or prevent sharp bending of the optical waveguide. Therefore, the configuration of the connector housing has become simple.

Furthermore, if the slope portion is formed on the inner wall surface defining the inner cavity portion of the connector housing in one aspect of the present invention, the optical waveguide can be bent and deformed until abutting against the aforementioned slope portion. Thus, it is possible to moderate the degree of the curvature of the optical waveguide in the aforementioned opening. As a result, it is possible to more reliably suppress or prevent the sharp bending of the optical waveguide.

DESCRIPTION OF EMBODIMENTS

The connector housing and the optical waveguide assembly of the present invention will be described below in detail based on the preferred embodiments shown in the accompanying drawings.

First Embodiment

Figure 1:
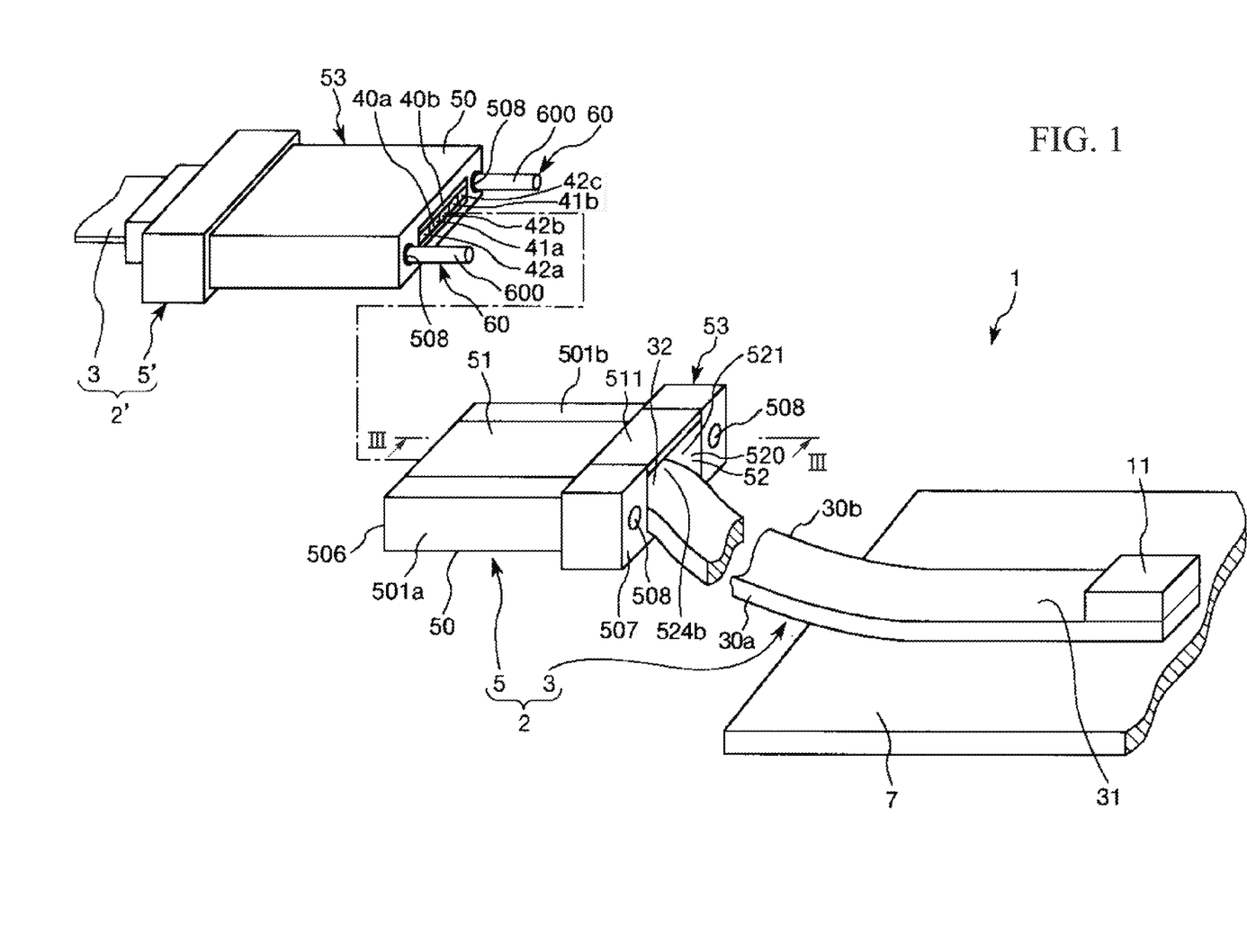
FIG. 1 is a perspective view showing an opto-electric hybrid board having a first embodiment of an optical waveguide assembly of the present invention (connector housing).
Figure 2:
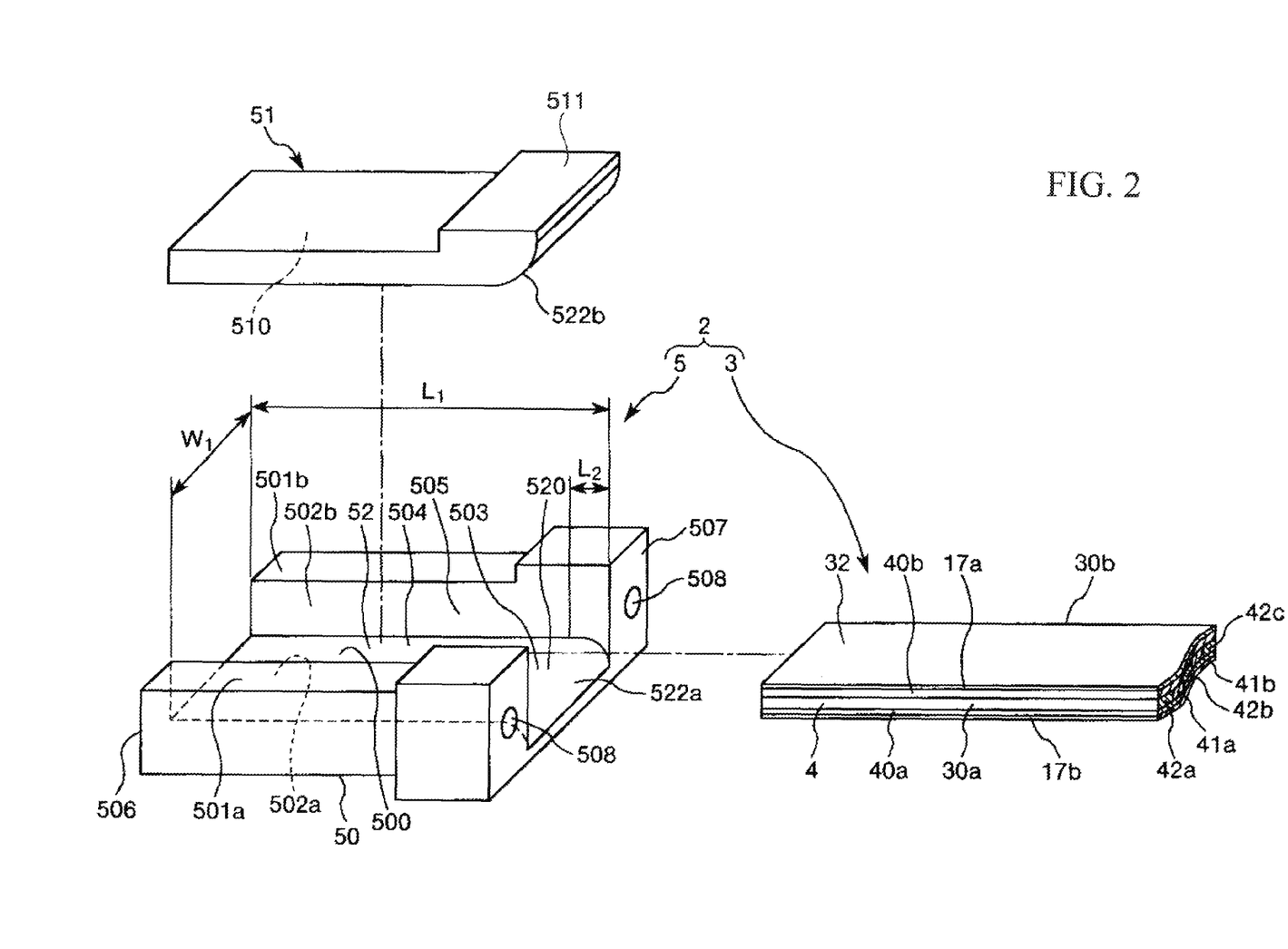
FIG. 2 is an exploded perspective view of the optical waveguide assembly in FIG. 1.
Figure 3:
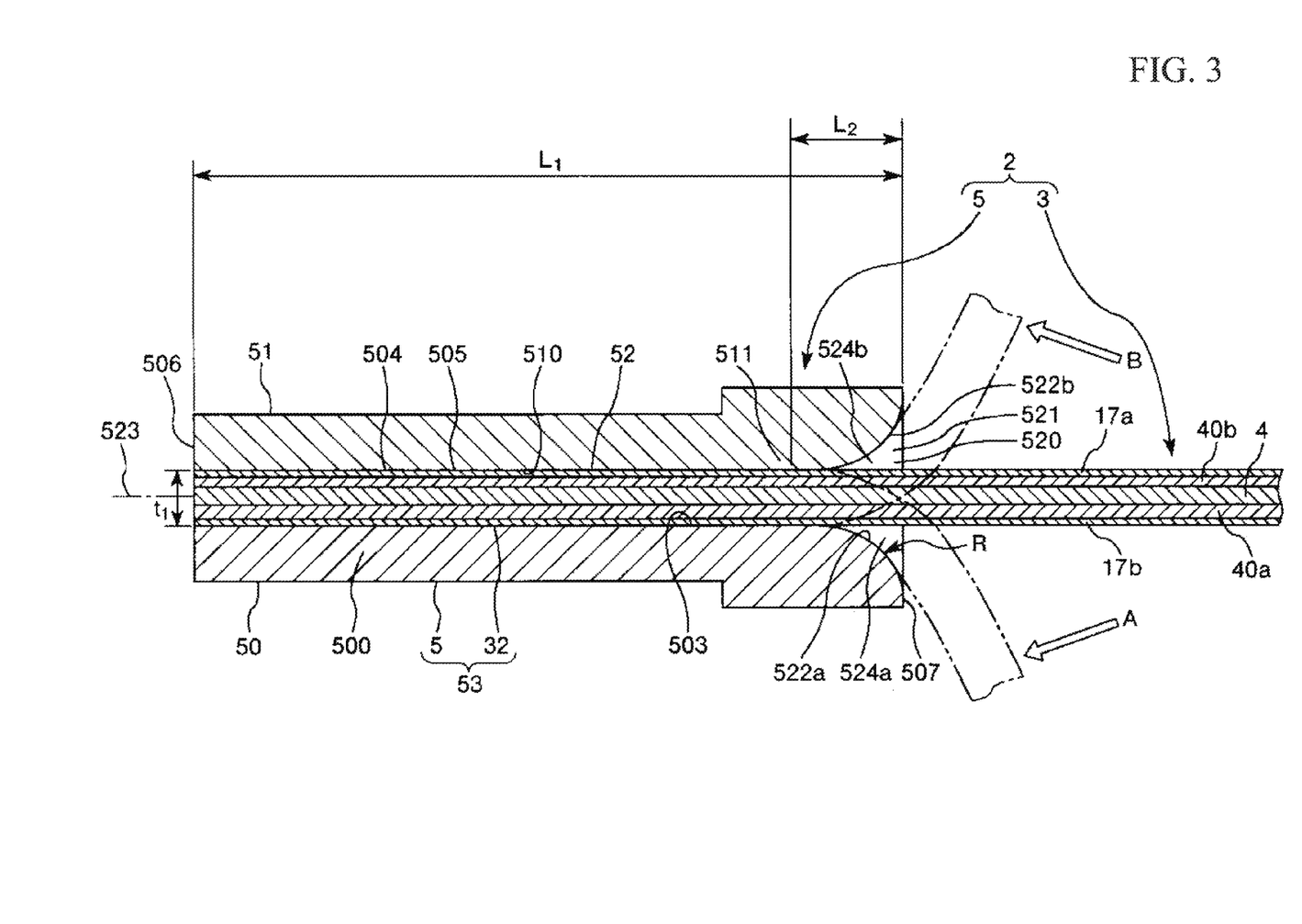
FIG. 3 is a sectional view taken along the line III-III in FIG. 1.

FIG. 1 is a perspective view showing an opto-electric hybrid board having a first embodiment of an optical waveguide assembly of the present invention (connector housing), FIG. 2 is an exploded perspective view of the optical waveguide assembly in FIG. 1 (connector housing), and FIG. 3 is a sectional view taken along the line III-III in FIG. 1. It should be noted that in the following, for convenience of description, the upper side in FIGS. 1 to 3 will be referred to as "above" or "upper", and the lower side will be referred to as "below" or "lower". In addition, the left side of FIGS. 1 to 3 will be referred to as the "front end", and the right side will be referred to as the "base end". Further, in FIG. 2 (and the same applies to FIGS. 1 and 3), the vertical direction (thickness direction) of the opto-electric hybrid board is illustrated in an exaggerated manner.

An opto-electric hybrid board 1 shown in FIG. 1 includes a circuit board (substrate) 7 which forms a plate shape, an optical waveguide assembly 2 disposed on the circuit board 7, and a light emitting device (optical device) 11 for emitting light. The optical waveguide assembly 2 is constituted of an optical waveguide 3 forming a band-like shape (elongated shape) and a connector housing 5 to be mounted onto the optical waveguide 3. In addition, in the connector housing 5, a front end portion 32 of the optical waveguide 3 is inserted so as to configure a connector portion 53 in that inserted state. The connector portion 53 is used by being connected to a connector portion 53 of an optical waveguide assembly 2' serving as a counterpart body to be connected.

The configuration of each portion will be described below.

As shown in FIG. 1, on the front side (upper surface) of the circuit board 7, a base end portion 31 of the optical waveguide 3 forming a band-like shape is arranged and fixed.

As shown in FIGS. 2 to 3, the optical waveguide 3 is composed of a cladding layer (first cladding layer (cladding portion)) 40a, a core layer 4, and a cladding layer (second cladding layer (cladding portion)) 40b, and formed by laminating these layers from the lower side in this order.

As shown in FIG. 2, in the core layer 4, a plurality of (for example, two in the present embodiment) core portions (waveguide channels) 41a and 41b forming an elongated shape, and a plurality of (for example, three in the present embodiment) side cladding portions (cladding portions) 42a, 42b, and 42c are formed, and these are arranged alternately in the width direction of the optical waveguide 3. As described above, the optical waveguide 3 is in the form of a multi-channel having a plurality of core portions.

The core portions 41a and 41b and the side cladding portions 42a to 42c have different light refractive indices from each other. The differences in the refractive index are not particularly limited, although they are preferably 0.5% or more, and more preferably 0.8% or more. It should be noted that the upper limit may not be particularly set, but is preferably about 5.5%.

In addition, the core portions 41a and 41b are formed of a material having a higher refractive index compared to the side cladding portions 42a to 42c, and also are formed of a material having a higher refractive index compared to the cladding layers 40a and 40b.

Each of the constituent materials of the core portions 41a and 41b and the side cladding portions 42a to 42c is not particularly limited. In the present embodiment, the core portions 41a and 41b and the side cladding portions 42a to 42c are composed of the same material, and the differences in the refractive indices between the core portions 41a and 41b and the side cladding portions 42a to 42c are developed by the differences in the chemical structures of the respective materials.

For the constituent material of the core layer 4, any materials can be used as long as they are substantially transparent materials to the light propagating through the core portions 41a and 41b. However, more specifically, glass materials or the like, such as silica glass and borosilicate glass, in addition to various resin materials, such as acrylic resins, methacrylic resins, polycarbonates, polystyrenes, epoxy resins, polyamides, polyimides, polybenzoxazoles, polysilanes, polysilazanes, and cyclic olefin-based resins, such as benzocyclobutene-based resins and norbornene-based resins, can be used.

Among them, in order to develop the refractive index difference by the differences in the chemical structures as in the present embodiment, materials that change the refractive index by irradiation of an active energy ray such as ultraviolet light and electron beam (or by further heating) are preferred.

Examples of such materials include materials in which at least a portion of the bonding may be cut or bonded, or at least a portion of the functional groups may be eliminated or modified to change the chemical structure, by irradiation of the active energy rays or by heating.

Specific examples include silane-based resins such as polysilanes (for example: polymethylphenylsilane) and polysilazanes (for example: perhydropolysilazane), and as a resin serving as a base of a material associated with the structural changes as described above, resins such as the following (1) to (6) which have a functional group in the side chain or the terminal of the molecule thereof can be mentioned: (1) an addition (co)polymer of a norbornene-type monomer obtained by adding and (co)polymerizing a norbornene-type monomer; (2) an addition copolymer of a norbornene-type monomer and ethylene or α-olefins; (3) an addition copolymer of a norbornene-type monomer and a non-conjugated diene, and other monomers if required; (4) a ring-opened (co)polymer of a norbornene-type monomer, and a resin obtained by hydrogenating the aforementioned (co)polymer, if required; (5) a ring-opened copolymer of a norbornene-type monomer and ethylene or α-olefins, and a resin obtained by hydrogenating the aforementioned (co) polymer, if required; and (6) norbornene-based resins such as a ring-opened copolymer of a norbornene-type monomer and a non-conjugated diene or other monomers, and a resin obtained by hydrogenating the aforementioned (co)polymer, if required, in addition to the acrylic resins and epoxy resins obtained by polymerizing a photocurable reactive monomer.

It should be noted that among these, norbornene-based resins are particularly preferred. These norbornene-based polymers can be obtained by any known polymerization methods, such as ring-opening metathesis polymerization (ROMP), a combination of ROMP and a hydrogenation reaction, polymerization using radicals or cations, polymerization using a cationic palladium polymerization initiator, and polymerization or the like using other polymerization initiators (for example, a polymerization initiator of nickel and other transition metals).

On both surfaces of the core layer 4, the cladding layers 40a and 40b are arranged, respectively. The cladding layers 40a and 40b are intended to form the cladding portions positioned in the lower portion and the upper portion of the core layer 4, respectively, and are in contact with the core layer 4. As a result, as shown in FIG. 2, each of the core portions 41a and 41b is configured in such a manner that the entire outer peripheral surface thereof is surrounded by the cladding portion, and functions as a light guide.

As the constituent material of the cladding layers 40a and 40b, for example, it is possible to use the same material as the constituent material of the core layer 4 described above, although norbornene-based polymers are particularly preferred. For example, as the norbornene-based polymer having a relatively low refractive index, those containing repeating units of norbornene having a substituent containing an epoxy structure at the end are preferred. Such norbornene-based polymers exhibit a particularly low refractive index, as well as favorable adhesion to the core layer 4.

In addition, the norbornene-based polymers containing repeating units of alkyl norbornenes are preferred. Since the norbornene-based polymers containing the repeating units of alkyl norbornenes have high flexibility, it is possible to impart high flexibility to the optical waveguide 3 by the use of such norbornene-based polymers.

Examples of the alkyl groups included in the repeating units of alkyl norbornenes include a propyl group, a butyl group, a pentyl group, a hexyl group, a heptyl group, an octyl group, a nonyl group and a decyl group, although a hexyl group is particularly preferred. It should be noted that these alkyl groups may be either linear or branched.

By containing the repeating units of hexyl norbornene, it is possible to prevent the refractive index of the norbornene-based polymer as a whole from increasing.

The optical waveguide 3 having a configuration as described above is suitably used in the data communication using light of a predetermined wavelength region (for example, about 600 to 1,550 nm).

In addition, as shown in FIGS. 2 to 3, the optical waveguide 3 as a whole, in other words, from the base end portion 31 over the front end portion 32, is covered (sandwiched) by two films 17a and 17b from the vertical direction. Each of the films 17a and 17b is intended to support and reinforce the optical waveguide 3, as well as to protect the optical waveguide 3.

It should be noted that between the optical waveguide 3 and the films 17a and 17b is bonded by a method such as thermocompression bonding, bonding using an adhesive or a tackifier, or the like.

In addition, the constituent materials of the films 17a and 17b are not particularly limited, and, for example, various resin materials including polyolefins such as polyethylene terephthalate (PET), polyethylene and polypropylene, polyimides and polyamides can be used. Further, in addition to the above, metal materials such as copper, aluminum and silver can also be used.

In addition, the thickness of the films 17a and 17b is not particularly limited, and, for example, is preferably from 5 to 200 μm, and more preferably from 5 to 30 μm. As a result, since each of the films 17a and 17b becomes to have an appropriate rigidity, it is possible to reliably support the optical waveguide 3, while it becomes difficult to inhibit the flexibility of the optical waveguide 3. In addition, the thickness of the film 17a and the thickness of the film 17b may be the same or may be different.

As shown in FIG. 1, in the base end portion 31 of the optical waveguide 3, the surface of the back side thereof (lower surface) is fixed to the circuit board 7.

As shown in FIG. 1, the light emitting device 11 is arranged and fixed onto the upper surface of the base end portion 31 of the optical waveguide 3. It should be noted that the light emitting device 11 may be configured of, for example, a vertical cavity surface emitting laser (VCSEL).

The light emitting device 11 is electrically connected to the circuit board 7. This makes it possible to operate the light emitting device 11.

In addition, the light emitting device 11 is optically connected to the core portions 41a and 41b of the optical waveguide 3.

As shown in FIGS. 1 to 3, the connector housing 5 is constituted of a housing having an inner cavity portion 52 which is formed by penetrating through from a front end 506 to a base end 507. The housing (connector housing 5) may be constituted of one member, but in the present embodiment, it is constituted of two members consisted of a main body 50 and a lid body 51. Further, the connector housing 5 is in an assembled state in which the main body 50 and the lid body 51 are assembled.

The main body 50 has a bottom plate 500 forming a plate-like shape, and a pair of side wall portions 501a and 501b that are spaced from each other and provided upright from the bottom plate 500. The side wall portion 501a has a side wall surface 502a, and the side wall portion 501b has a side wall surface 502b. The side wall surface 502a and the side wall surface 502b are surfaces facing each other. In addition, a portion surrounded by the side wall surface 502a of the side wall portion 501a, the side wall surface 502b of the side wall portion 501b and the bottom plate 500 forms a groove 504. The groove 504 has an opening 505 which is opened upward.

The connector housing 5 is assembled in such a manner that the lid body 51 composed of a plate member closes the opening 505. In order to improve the adhesion between the lid body 51 and the optical waveguide 3, a modification treatment such as a plasma treatment, a UV treatment and a corona treatment may be performed on the lid body 51. In the assembled state of the connector housing 5 where the opening 505 of the groove 504 is closed with the lid body 51, an inner cavity portion 52 is formed which is defined by four inner wall surfaces consisted of a back surface 510 as a lower surface of the lid body 51, a bottom surface 503 of the groove 504, and a pair of side wall surfaces 502a and 502b.

As shown in FIGS. 2 and 3, in the base end portion 520 of the inner cavity portion 52, a base end opening 521 is formed. In the base end opening 521, the distance between the inner wall surfaces that are facing each other in the thickness direction of the optical waveguide 3 is gradually increased toward the base end direction. In addition, a slope portion 522a is formed in a portion facing the base end opening 521 of the bottom surface 503, and a slope portion 522b is formed in a portion facing the base end opening 521 of the back surface 510 of the lid body. The slope portion 522a and the slope portion 522b are inclined in such a manner that the separation distance from each other gradually increases toward the base end direction.

In the present embodiment, since the slope portions 522a and 522b have the same shape, the slope portion 522a will be described as a representative.

As shown in FIGS. 2 and 3, the slope portion 522a has a shape bent along the direction of the central axis 523 of the inner cavity portion 52. In addition, its curvature R is gradually increased toward the base end direction.

An average of the curvature R of the slope portion 522a is, for example, preferably from 3 mm to 10 mm, and more preferably from 4 mm to 7 mm. If the average of the curvature R of the slope portion 522a is less than the aforementioned lower limit, the optical waveguide 3 is easily broken by bending when the optical waveguide 3 is bent locally. If the average of the curvature R of the slope portion 522a is greater than the aforementioned upper limit, the bending reliability tends to drop due to the stress concentration when the optical waveguide 3 is bent locally.

The slope portion 522b having the same shape as that of the slope portion 522a is provided in the base end portion 511 of the back surface 510 of the lid body 51. Because of the provision of the slope portions 522a and 522b, in a natural state where no external force is applied to the optical waveguide 3, the optical waveguide 3 forms a gap 524a with the slope portion 522a therebetween, and forms a gap 524b with the slope portion 522b therebetween, in the base end opening 521.

As shown in FIG. 3, from the natural state, if an external force is applied to the optical waveguide 3 in the direction of an arrow A, the optical waveguide 3 can be bent and deformed until it abuts against the slope portion 522a. As a result, the optical waveguide 3 becomes a gently bent state in the gap 524a. Therefore, it is possible to reliably suppress or prevent the sharp bending of the optical waveguide 3.

On the other hand, from the natural state, if an external force is applied to the optical waveguide 3 in the direction of an arrow B, the optical waveguide 3 can be bent and deformed until it abuts against the slope portion 522b. As a result, the optical waveguide 3 becomes a gently bent state in the gap 524b. Therefore, it is possible to reliably suppress or prevent the sharp bending of the optical waveguide 3.

Because the connector housing 5 has a simple structure for holding the optical waveguide 3 by the bottom surface 503 of the main body 50 and the back surface 510 of the lid body 51, it is possible to adjust the position of the optical waveguide 3 with respect to the connector housing 5 in the width direction. The position of the optical waveguide 3 in the width direction can be adjusted even after the insertion of the optical waveguide 3 into the connector housing 5. In addition, because of the provision of the slope portion having the curvature R described above, since not only the guide during insertion of the optical waveguide 3 is easy, but also the positions of the films 17a and 17b can be seen, the effect of facilitating the positioning can be achieved.

A length L2 of the slope portions 522a and 522b along the direction of the central axis 523 is, for example, preferably from 10 to 50%, and more preferably from 20 to 40%, of a length L1 of the inner cavity portion 52 along the direction of the central axis 523.

As a result, the optical waveguide 3 can be deformed to an extent to be sufficiently gently bent until it abuts against the slope portion 522a or 522b. Therefore, it is possible to more reliably suppress or prevent the sharp bending of the optical waveguide 3. It is possible to suitably prevent breakage of the optical waveguide 3 which is particularly weak against the bending in the vertical direction.

An adhesive may be used for fixing the optical waveguide 3 and the main body 50. When the optical waveguide 3 and the bottom surface 503 of the main body 50 is fixed through an adhesive, it is possible to sufficiently secure the bonding area between the optical waveguide 3 and the bottom surface 503 of the main body 50. In addition, if the optical waveguide 3 and the back surface 510 of the lid body 51 are fixed through an adhesive in a similar manner, it is possible to sufficiently secure the bonding area between the optical waveguide 3 and the back surface 510 of the lid body 51. Accordingly, it is possible to prevent the connector housing 5 from being reluctantly removed from the optical waveguide 3. One-sided bonding may be employed where the optical waveguide 3 is adhered only to one of the bottom surface 503 of the main body 50 and the back surface 510 of the lid body 51. In the case of both-sided bonding, because the linear expansion coefficients between the bottom surface 503 of the main body 50 and the optical waveguide 3 and between the back surface 510 of the lid body 51 and the optical waveguide 3 differ from each other, the thermal stress generated between both sides of the optical waveguide 3 can be relaxed by employing the one-sided bonding.

In addition, the adhesive present between the optical waveguide 3 and the bottom surface 503 of the main body 50 or between the optical waveguide 3 and the back surface 510 of the lid body 51 may be used so as to protrude in the slope portion 522a or the slope portion 522b. In this case, the adhesive portion becomes thick, and it is possible to increase the adhesion strength and the adhesive force between the optical waveguide 3 and the main body 50. In addition, by adding an adhesive or an elastic material to the slope portions 522a and 522b, respectively, it is also possible to suitably adjust the curvature R and to control the bending angle of the optical waveguide 3.

Further, in the pair of side wall portions 501a and 501b of the connector housing 5, guide holes 508 penetrating from the front end 506 to the base end 507 are formed, respectively. The guide holes 508 are for inserting a guide pin 60 used when connecting to the connector portion 53 of the optical waveguide assembly 2' (see FIG. 1).

As shown in FIG. 2, the length L1 along the longitudinal direction of the optical waveguide 3 of the inner cavity portion 52 (the length of the inner cavity portion 52) is not particularly limited, and it is, for example, preferably from 1.0 to 20.0 mm, and more preferably from 3.0 to 10.0 mm. In addition, the length w1 along the width direction of the optical waveguide 3 of the inner cavity portion 52 (the width of the inner cavity portion 52) is not particularly limited, and it is, for example, preferably from 2.5 to 4.0 mm, and more preferably from 2.9 to 3.7 mm. Further, as shown in FIG. 3, the length t1 along the thickness direction of the optical waveguide 3 of the inner cavity portion 52 (the height of the inner cavity portion 52) is not particularly limited, and it is, for example, preferably from 0.04 to 0.25 mm, and more preferably from 0.08 to 0.16 mm.

The constituent materials of this type of main body 50 and the lid body 51 are not particularly limited, although examples thereof include a resin material in which an inorganic filler is loaded. As the resin material, for example, a thermosetting epoxy resin and PPS (polyphenylene sulfide) may be used. In addition, as the inorganic filler, for example, particulate silica, a glass filler, alumina, white carbon, bentonite or the like is used.

The opto-electric hybrid board 1 including the optical waveguide assembly 2 having the configuration as described above can be mounted onto, for example, router devices, WDM devices, mobile phones, vehicles, game machines, personal computers, television sets, home servers, and other various electric appliances.

Next, the optical waveguide assembly 2' will be described.

As shown in FIG. 1, the optical waveguide assembly 2' is constituted of an optical waveguide 3 and a connector housing 5' to be mounted onto the base end portion 31 of the aforementioned optical waveguide 3. The connector housing 5' is the same as the connector housing 5 described above, with the exception that the slope portions 522a and 522b are omitted.

The connector housing 5' has an inner cavity portion 52 in the same manner as the connector housing 5. In the inner cavity portion 52 of the connector housing 5', a front end portion 32 of the optical waveguide 3 is inserted. In the optical waveguide assembly 2', a connector portion 53 is configured by the front end portion 32 of the optical waveguide 3 which is inserted into the inner cavity portion 52 of the connector housing 5' and the connector housing 5'.

When connecting the connector portion 53 of the connector housing 5 and the connector portion 53 of the connector housing 5', the guide pins 60 are first inserted halfway in the longitudinal direction into the respective guide holes 508 of the connector housing 5'. At this time, the remaining portion of the guide pin 60 which is not inserted into the guide hole 508 is protruded from the guide hole 508 (hereinafter, this portion will be referred to as a projecting portion 600). Then, the projecting portion 600 will be inserted into the guide hole 508 provided in the connector housing 5. As a result, a connected state is achieved in which the connector portion 53 of the connector housing 5 and the connector portion 53 of the connector housing 5' are connected. In this connected state, the core portions 41a and 41b of the optical waveguide 3 of the optical waveguide assembly 2 are optically connected to the core portions 41a and 41b of the optical waveguide 3 of the optical waveguide assembly 2', respectively. As a result, it is possible to perform data communication using light between the optical waveguide 3 of the opto-electric hybrid board 1 and the optical waveguide 3 of the optical waveguide assembly 2'.

It should be noted that although the guide pin 60 is first inserted into the connector housing 5' in the configuration shown in the drawings, it is not limited thereto and may be inserted and connected to the connector housing 5 first.

Second Embodiment

Figure 4:
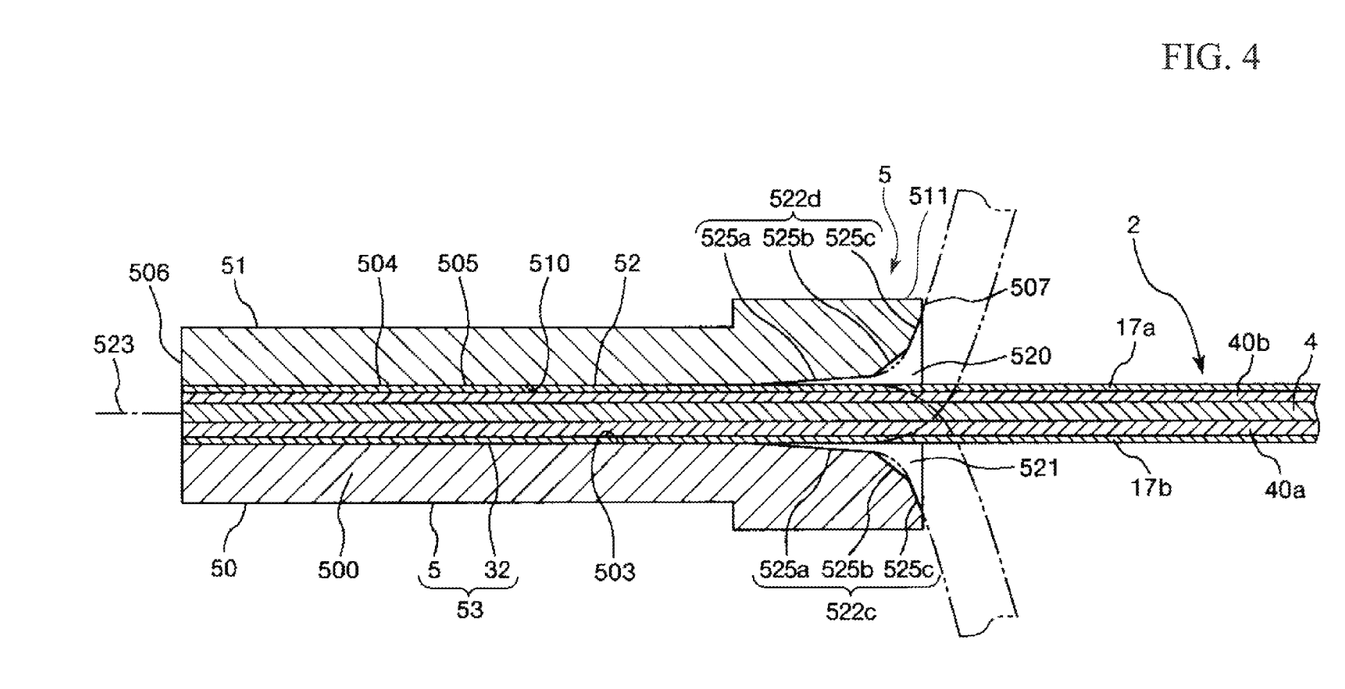
FIG. 4 is a longitudinal sectional view showing a second embodiment of the optical waveguide assembly of the present invention (connector housing).

FIG. 4 is a longitudinal sectional view showing a second embodiment of the optical waveguide assembly of the present invention (connector housing).

Hereinafter, a second embodiment of the connector housing and the optical waveguide assembly of the present invention will be described with reference to this drawing, although the description will be given by focusing on the differences from the embodiment described above, and the description of similar matters will be omitted.

The present embodiment is the same as the aforementioned first embodiment, with the exception that the shape of the slope portion is different.

As shown in FIG. 4, a slope portion 522c is provided in a bottom plate 500 of the main body 50. In addition, a slope portion 522d is provided in a back surface 510 of the lid body 51.

In the present embodiment, the slope portion 522c and the slope portion 522d have a first plane 525a, a second plane 525b, and a third plane 525c, respectively. Since the slope portions 522c and 522d have the same shape and only their locations are different, the slope portion 522c will be described as a representative.

The first plane 525a, the second plane 525b, and the third plane 525c are arranged in this order from the front end side. Inclination angles of the first plane 525a to the third plane 525c with respect to the central axis 523 are gradually increased toward the base end direction, respectively. Among the inclination angles of the first plane 525a to the third plane 525c with respect to the central axis 523, the inclination angle of the first plane 525a is the smallest, and the inclination angle of the third plane 525c is the largest. The inclination angle of the second plane 525b has an intermediate size of the inclination angle of the first plane 525a and the inclination angle of the third plane 525c.

Because of this type of configuration, with regard to the slope portions 522c and 522d having the first plane 525a, the second plane 525b, and the third plane 525c, the separation distance from each other is gradually increased toward the base end direction. This makes it possible to moderate the degree of curvature of the optical waveguide 3 in the base end opening 521. As a result, it is possible to reliably suppress or prevent sharp bending of the optical waveguide 3 as in the first embodiment.

The inclination angle of the first plane 525a with respect to the central axis 523 is, for example, preferably from 5 to 20°, and more preferably from 10 to 15°. In addition, the inclination angle of the second plane 525b with respect to the central axis 523 is, for example, preferably from 20 to 50°, and more preferably from 30 to 40°. Further, the inclination angle of the third plane 525c with respect to the central axis 523 is, for example, preferably from 50 to 80°, and more preferably from 60 to 70°.

As described above, in the first embodiment, the slope portions 522a and 522b have a curved shape. On the other hand, in the present embodiment, the slope portions 522c and 522d are composed of a plurality of planes. In the present invention, depending on the shape of the slope portions, it is possible to use a material suitable for each formation.

Third Embodiment

Figure 5:
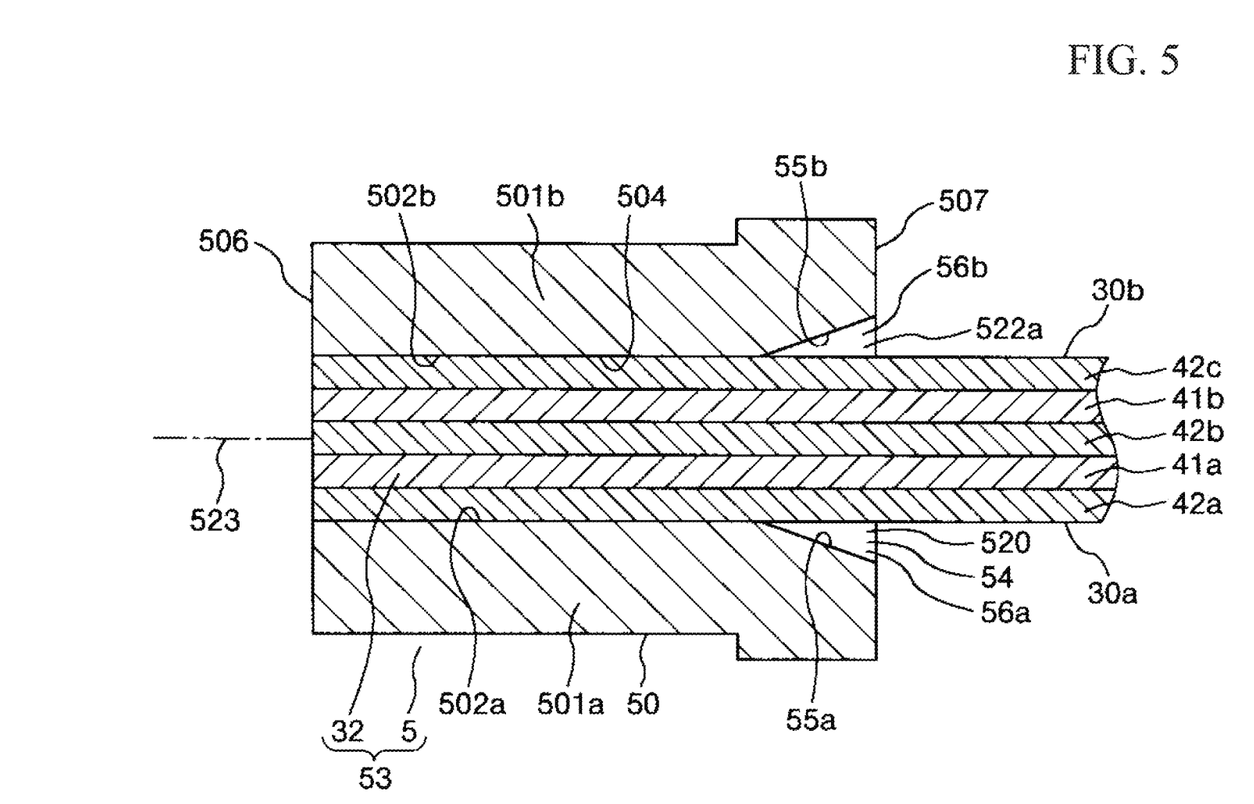
FIG. 5 is a cross sectional view showing a third embodiment of the optical waveguide assembly of the present invention (connector housing).

FIG. 5 is a cross sectional view showing a third embodiment of the optical waveguide assembly of the present invention (connector housing).

Hereinafter, a third embodiment of the connector housing and the optical waveguide assembly of the present invention will be described with reference to this drawing, although the description will be given by focusing on the differences from the embodiments described above, and the description of similar matters will be omitted.

The present embodiment is the same as the aforementioned first embodiment, with the exception that the shape of the inner cavity portion (the pair of side wall portions) is different.

As shown in FIG. 5, in the present embodiment, a widened portion 54 is provided in a base end portion 520 of the inner cavity portion 52. The widened portion 54 is a portion where the distance along the width direction of the optical waveguide 3 of the inner cavity portion 52 is gradually increased toward the base end direction.

In addition, a slope surface 55a is formed in a portion facing the widened portion 54 of the side wall surface 502a. A slope surface 55b is formed in a portion facing the widened portion 54 of the side wall surface 502b. The slope surface 55a and the slope surface 55b are inclined in such a manner that the separation distance between these portions gradually increases in the base end direction.

Because of the provision of this type of slope surfaces 55a and 55b, a gap 56a is formed between a side surface 30a of the optical waveguide 3 and the slope surface 55a, and a gap 56b is formed between the slope surface 55b and a side surface 30b. As a result, when the optical waveguide 3 is bent and deformed in the base end opening 521, the side surfaces 30a and 30b of the optical waveguide 3 are prevented from being worn out, and the inherent high transmission characteristics of the optical waveguide can be maintained in a reliable manner.

Although the connector housing and the optical waveguide assembly of the present invention have been described above for the embodiments shown by the drawings, the present invention is not limited thereto. Each component constituting the connector housing and the optical waveguide assembly can be replaced with those having an arbitrary configuration that may exhibit similar functions. In addition, an arbitrary constituent may be added.

Further, the connector housing and the optical waveguide assembly of the present invention may be a combination of any two or more configurations (features) of the aforementioned embodiments.

In the gap between the optical waveguide and the slope portion of the connector housing, a member rich in flexibility may be filled.

In addition, although a counterpart body to be connected to the opto-electric hybrid board is an optical waveguide which forms a three-layer structure having a band-like shape, the present invention is not limited thereto, and a bundle of a plurality of flexible optical fibers may be employed. In this case, the optical fibers may be aligned in the radial direction and bundled with a film or the like.

Furthermore, in the present embodiment, although the slope portion is formed on both the main body and the lid body, it is not limited to this configuration and may be formed only on one or the other. In this case, the slope portion can be provided on either the main body or the lid body through an appropriate selection in accordance with the direction in which the optical waveguide is curved, or the like.

EXAMPLES

1. Production of Optical Waveguide

Example 1

(1) Synthesis of Polyolefin-Based Resin

In a glove box filled with dry nitrogen where levels of both moisture and oxygen concentration were controlled to 1 ppm or less, 7.2 g (40.1 mmol) of hexylnorbornene (HxNB) and 12.9 g (40.1 mmol) of diphenylmethyl norbornene methoxysilane were weighed into a 500 mL vial, 60 g of dehydrated toluene and 11 g of ethyl acetate were added thereto, and the upper portion was sealed by covering a sealer made of silicon.

Then, 1.56 g (3.2 mmol) of a Ni catalyst and 10 mL of dehydrated toluene were weighed into a 100 mL vial, and after placing a stirrer chip therein and hermetical sealing, the catalyst was completely dissolved by sufficiently stirring the resulting mixture.

1 mL of this Ni catalyst solution was accurately weighed using a syringe and quantitatively injected into the vial in which the above two kinds of norbornene were dissolved, and the resultant was stirred for 1 hour at room temperature. As a result, a significant increase in viscosity was observed. The plug was removed at this point, and 60 g of tetrahydrofuran (THF) was added thereto to perform stirring, thereby obtaining a reaction solution.

9.5 g of acetic anhydride, 18 g of hydrogen peroxide solution (concentration of 30%) and 30 g of ion exchanged water were added and stirred in a 100 mL beaker to prepare an aqueous solution of peracetic acid. Then, the entirety of the aqueous solution was added to the above reaction solution and stirred for 12 hours to conduct a reduction treatment of Ni.

Next, the reaction solution obtained by the completion of the treatment was transferred to a separatory funnel, and after removing the lower aqueous layer, 100 mL of a 30% aqueous solution of isopropyl alcohol was added thereto, followed by vigorous stirring. The resultant was allowed to stand, and the aqueous layer was removed after complete two-layer separation was confirmed. After repeating this washing process 3 times in total, the oil layer was added dropwise into a large excess of acetone, thereby re-precipitating the generated polymer. After separating the filtrate and the precipitate by filtration, the precipitate was heated and dried for 12 hours in a vacuum dryer set to 60° C., thereby obtaining a polymer #1. The molecular weight distribution of the polymer #1 was determined based on GPC measurement, which was Mw=100,000 and Mn=40,000. In addition, the molar ratio of each structural unit in the polymer #1 which was measured by NMR was 50 mol % for the hexyl norbornene structural unit, and 50 mol % for the diphenylmethyl norbornene methoxysilane structural unit.

(2) Production of Core Layer-Forming Composition 10 g of the purified polymer #1 described above was weighed into a 100 mL glass container, and 40 g of mesitylene, 0.01 g of an antioxidant Irganox 1076 (manufactured by Ciba-Geigy), 2 g of a cyclohexyl oxetane monomer (manufactured by Toagosei Co., Ltd., CHOX, CAS #483303-25-9, molecular weight: 186, boiling point: 125° C./1.33 kPa), and a polymerization initiator (photoacid generator) RhodorsilPhotoinitiator 2074 (manufactured by Rhodia Inc., CAS #178233-72-2) (0.025 g, in 0.1 mL of ethyl acetate) were added thereto and uniformly dissolved. Thereafter, the resultant was filtered through a PTFE filter of 0.2 μm to obtain a clean, core layer-forming composition. It should be noted that the polymer #1 has a function of eliminating the leaving group upon irradiation with active radiation, causing the so-called photobleaching phenomenon.

(3) Production of Cladding Layer-Forming Composition

A cladding layer-forming composition was obtained in the same manner as the core layer-forming composition, with the exception that those obtained by changing the molar ratio of each structural unit of the purified polymer #1 described above to 80 mol % for the hexyl norbornene structural unit and 20 mol % for the diphenylmethyl norbornene methoxysilane structural unit, respectively, were used in place of the aforementioned polymer #1.

(4) Preparation of Lower Cladding Layer

After applying the cladding layer-forming composition uniformly onto a polyimide film having a thickness of 25 μm using a doctor blade, the resultant was charged into a dryer at 50° C. for 10 minutes. After removing the solvent completely, ultraviolet rays were irradiated to the entire surface using a UV exposure machine to cure the applied composition. As a result, a colorless transparent lower cladding layer having a thickness of 10 μm and a first cover film (polyimide film) were obtained. It should be noted that the integrated light quantity of ultraviolet rays was 500 mJ/cm$^2$. In addition, characteristics of the first cover film are as shown in Table 1.

(5) Preparation of Core Layer

After applying a core layer resin composition uniformly onto the prepared lower cladding layer using a doctor blade, the resultant was charged into a dryer at 50° C. for 10 minutes. After completely removing the solvent to form a coating film, a photomask in which a linear pattern of line and space was drawn over the entire surface was crimped onto the resulting coating film. Further, ultraviolet rays were irradiated from above the photomask using a parallel exposure machine. It should be noted that the integrated light quantity of ultraviolet rays was 1,300 mJ/cm$^2$.

Then, the photomask was removed, and the resultant was charged into an oven at 150° C. for 30 minutes. When taken out from the oven, it was confirmed that a clear waveguide pattern appeared in the coating film. A width L and a space S of the core portion of the waveguide pattern are shown in Table 3, respectively. In addition, the thickness of the obtained core layer was 50 μm, and the number of the core portions was eight.

(6) Preparation of Upper Cladding Layer

A colorless transparent upper cladding layer having a thickness of 10 μm was obtained by applying a cladding layer-forming resin composition on the prepared core layer in the same manner as in the section (3). Then, a polyimide film having a thickness of 25 μm was placed and crimped thereon. As a result, a second cover film was obtained. An optical waveguide was obtained in the manner described above.

2. Mounting of Optical Waveguide to Connector Housing

As shown in FIGS. 2 and 3, the main body 50 and the lid body 51 constituting the connector housing 5, and the optical waveguide 3 were prepared, respectively. As the optical waveguide 3, the optical waveguide obtained above was used. The main body 50 and the lid body 51 of the connector housing 5 were configured in such a manner that a length L1 of the inner cavity portion 52 was set to 8 mm, a length L2 of the slope portion 522a and the slope portion 522b was set to 2 mm, averages of the curvature R of the slope portion 522a and the slope portion 522b were set to 3 mm, respectively, a width w1 of the inner cavity portion 52 was set to 3.5 mm, and a height t1 of the inner cavity portion 52 was set to 0.8 mm. Subsequently, the optical waveguide 3 was mounted onto the connector housing 5 on the bottom surface 503 side by using an epoxy-based adhesive. Then, according to the following procedure, the bending test and the yield at the time of implementation were evaluated.

(Bending Test)

The optical waveguide 3 which was mounted to the connector housing 5 was subjected to a bending resistance test in accordance with JIS C 5016 8.6 at 23° C. The speed of reciprocation in the test was set to 120 times/min, the gap of the parallel flat plate was set to 20 mm, and the base end 507 side was fixed as a reciprocating side. After the completion of reciprocation, the resultant was allowed to stand for 2 hours or more in the measurement environment. Thereafter, the degree of the folding and swelling of the optical waveguide 3 was observed. Evaluation criteria of the bending resistance were set in such a manner that the case where the number of reciprocation at which folding or swelling of the optical waveguide 3 occurred was equal to or more than 100 thousand times was evaluated as ⊚, the case where the number was less than 100 thousand times, but equal to or more than 30 thousand times was evaluated as ◯, the case where the number was less than 30 thousand times, but equal to or more than 10 thousand times was evaluated as Δ, and the case where the number was less than 10 thousand times was evaluated as ×. In the test of the present example, the number of reciprocation at which folding or swelling of the optical waveguide 3 occurred was less than 50 thousand times, and the bending resistance was evaluated as ◯.

(Evaluation of Yield During Implementation)

When a device was implemented by setting the connector portion 53 of the connector housing 5 to which the optical waveguide 3 was mounted on the mirror side, the number of times the optical waveguide 3 in the connector portion 53 became poor was counted, and the ratio was calculated as the failure rate during implementation. The presence of abnormality such as folding or swelling in the optical waveguide 3 was determined as the failure of the optical waveguide 3. The case where the failure rate during implementation was less than 5% was evaluated as ⊚, the case where the rate was equal to or more than 5%, but less than 10% was evaluated as ◯, the case where the rate was equal to or more than 10%, but less than 20% was evaluated as Δ, and the case where the rate was equal to or more than 20% was evaluated as ×. The failure rate during implementation by the test of the present example was 8%, and was evaluated as ○.

Example 2

The bending resistance test and the calculation of the failure rate during implementation were carried out in the same manner as in Example 1 with the exception that the average of the curvature R of the slope portion 522a and the slope portion 522b of the connector housing 5 was set to 5 mm. In the test of the present example, the number of reciprocation at which folding or swelling of the optical waveguide 3 occurred was equal to or more than 100 thousand times, and the bending resistance was evaluated as ⊚. The failure rate during implementation was 8%, and was evaluated as ○.

Example 3

The bending resistance test and the calculation of the failure rate during implementation were carried out in the same manner as in Example 1 with the exception that the average of the curvature R of the slope portion 522a and the slope portion 522b of the connector housing 5 was set to 10 mm. In the test of the present example, the number of reciprocation at which folding or swelling of the optical waveguide 3 occurred was equal to or more than 100 thousand times, and the bending resistance was evaluated as ⊚. The failure rate during implementation was 8%, and was evaluated as ○.

Comparative Example 1

The bending resistance test and the calculation of the failure rate during implementation were carried out in the same manner as in Example 1 with the exception that the curvature R was not provided in the slope portion 522a and the slope portion 522b of the connector housing 5. In the test of the present comparative example, the number of reciprocation at which folding or swelling of the optical waveguide 3 occurred was less than 10 thousand times, and the bending resistance was evaluated as ×. The failure rate during implementation was 20%, and was evaluated as ×.

TABLE 1

|  | Ex. 1 | Ex. 2 | Ex. 3 | Comp. Ex. 1 |
| --- | --- | --- | --- | --- |
| R (mm) | 3 | 5 | 10 | Absent |
| Bending resistance | ○ | ⊚ | ⊚ | X |
| Failure rate during implementation | ○ | ○ | ○ | X |

INDUSTRIAL APPLICABILITY

According to the present invention, in the opening of the connector housing, the optical waveguide can be bent and deformed. Therefore, the present invention can reliably suppress or prevent sharp bending of the optical waveguide.

In the present invention, even if the protective member is omitted, it is possible to reliably suppress or prevent sharp bending of the optical waveguide. Therefore, the configuration of the connector housing can be simplified.

Furthermore, if the slope portion is formed on the inner wall surface defining the inner cavity portion of the connector housing, the optical waveguide can be bent and deformed until abutting against the aforementioned slope portion. Thus, it is possible to moderate the degree of the curvature of the optical waveguide in the aforementioned opening. As a result, it is possible to more reliably suppress or prevent the sharp bending of the optical waveguide.

REFERENCE SIGNS LIST

1: Opto-electric hybrid board;
2, 2': Optical waveguide assembly;
3: Optical waveguide;
30a, 30b: Side surface;
31: Base end portion;
32: Front end portion;
40a: Cladding layer (first cladding layer (cladding portion));
40b: Cladding layer (second cladding layer (cladding portion));
4: Core layer;
41a, 41b: Core portion (waveguide channel);
42a, 42b, 42c: Side cladding portion (cladding portion);
5, 5': Connector housing;
50: Main body;
500: Bottom plate;
501a, 501b: Side wall portion;
502a, 502b: Side wall surface;
503: Bottom surface;
504: Groove;
505: Opening;
506: Front end;
507: Base end;
508: Guide hole;
51: Lid body;
510: Back surface;
511: Base end portion;
52: Inner cavity portion;
520: Base end portion;
521: Base end opening;
522a, 522b, 522c, 522d: Slope portion;
523: Central axis;
524a, 524b: Gap;
525a: First plane;
525b: Second plane;
525c: Third plane;
53: Connector portion;
54: Widened portion;
55a, 55b: Slope surface;
56a, 56b: Gap;
60: Guide pin;
600: Projecting portion;
7: Circuit board (substrate);
11: Optical device (light receiving/light emitting device, driving element, connector, and the like);
17a, 17b: Film;
L1, L2, w1, t1: Length;
R: Curvature

The invention claimed is:
1. A connector housing, comprising:
a housing including a front end portion, a base end portion having a base end opening, and an inner cavity portion extending from the front end portion to the base end portion and configured such that a front end portion of a flexible optical waveguide having a band shape is inserted from the base end opening into the inner cavity portion to the front end portion, wherein the inner cavity portion of the housing has a length that extends in a longitudinal direction of the flexible optical waveguide, a width that extends in a width direction of the flexible optical waveguide, and a height that extends in a thickness direction of the flexible optical waveguide, and the housing has a pair of walls forming a pair of inner wall surfaces facing each other in the inner cavity portion such that the pair of inner wall surfaces is gradually increasing a separation distance between the inner wall surfaces in the thickness direction of the flexible optical waveguide toward a base end side of the housing at the base end opening.

2. The connector housing according to claim 1, wherein the inner cavity portion is defined by a plurality of inner wall surfaces including the pair of inner wall surfaces facing in the thickness direction of the flexible optical waveguide, and at least one of the pair of inner wall surfaces includes a slope portion at the base end opening such that the slope portion is inclined and gradually separated from a central axis of the inner cavity portion that extends in the longitudinal direction of the flexible optical waveguide.

3. The connector housing according to claim 2, wherein each of the pair of inner wall surfaces includes the slope portion.

4. The connector housing according to claim 3, wherein the slope portion has an average curvature R of not less than 3 mm and not more than 10 mm.

5. The connector housing according to claim 3, wherein the housing is formed such that a gap is formed between the flexible optical waveguide and the slope portion at the base end opening.

6. The connector housing according to claim 3, wherein the slope portion is curved.

7. The connector housing according to claim 3, wherein the slope portion includes a plurality of planes such that each of the planes has a different angle of inclination with respect to the central axis.

8. The connector housing according to claim 3, wherein the housing is formed such that a length of the slope portion along the central axis is from 10% to 50% of a length of the inner cavity portion along the central axis.

9. The connector housing according to claim 3, wherein the housing includes a main body having a groove that defines a part of the inner wall surfaces of the inner cavity portion, and a lid body configured to cover the groove.

10. The connector housing according to claim 9, wherein the housing is configured to hold the front end portion of the flexible optical waveguide between a bottom surface of the groove and the lid body.

11. The connector housing according to claim 2, wherein the slope portion has an average curvature R of not less than 3 mm and not more than 10 mm.

12. The connector housing according to claim 2, wherein the housing is formed such that a gap is formed between the flexible optical waveguide and the slope portion at the base end opening.

13. The connector housing according to claim 2, wherein the slope portion is curved.

14. The connector housing according to claim 2, wherein the slope portion includes a plurality of planes such that each of the planes has a different angle of inclination with respect to the central axis.

15. The connector housing according to claim 2, wherein the housing is formed such that a length of the slope portion along the central axis is from 10% to 50% of a length of the inner cavity portion along the central axis.

16. The connector housing according to claim 2, wherein the housing includes a main body having a groove that defines a part of the inner wall surfaces of the inner cavity portion, and a lid body configured to cover the groove.

17. The connector housing according to claim 16, wherein the housing is configured to hold the front end portion of the flexible optical waveguide between a bottom surface of the groove and the lid body.

18. The connector housing according to claim 1, wherein the housing includes a main body having a groove that defines a part of the inner wall surfaces of the inner cavity portion, and a lid body configured to cover the groove.

19. The connector housing according to claim 18, wherein the housing is configured to hold the front end portion of the flexible optical waveguide between a bottom surface of the groove and the lid body.

20. An optical waveguide assembly, comprising:
the flexible optical waveguide; and
the connector housing according to claim 1.

* * * * *